(12) United States Patent
Reial et al.

(10) Patent No.: US 9,071,472 B1
(45) Date of Patent: Jun. 30, 2015

(54) METHOD AND APPARATUS FOR SIGNAL PARAMETER ESTIMATION

(71) Applicant: Telefonaktiebolaget L M Ericsson (publ), Stockholm (SE)

(72) Inventors: Andres Reial, Malmö (SE); Jung-Fu Cheng, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/323,073

(22) Filed: Jul. 3, 2014

(51) Int. Cl.
| | |
|---|---|
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |
| H04L 25/02 | (2006.01) |
| H04B 7/04 | (2006.01) |

(52) U.S. Cl.
CPC .......... *H04L 25/0202* (2013.01); *H04B 7/0413* (2013.01)

(58) Field of Classification Search
CPC ........................ H04L 25/0202; H04B 7/0413
USPC .......................................................... 375/346
See application file for complete search history.

(56) References Cited

U.S. PATENT DOCUMENTS

| | | | | |
|---|---|---|---|---|
| 6,704,353 | B1 * | 3/2004 | McCarty et al. | 375/227 |
| 2004/0087309 | A1 * | 5/2004 | Joshi et al. | 455/450 |
| 2005/0105638 | A1 * | 5/2005 | Owen et al. | 375/295 |
| 2007/0071072 | A1 * | 3/2007 | Banister et al. | 375/148 |
| 2009/0124204 | A1 * | 5/2009 | Howard et al. | 455/59 |
| 2009/0245219 | A1 * | 10/2009 | McKown | 370/342 |
| 2010/0054373 | A1 * | 3/2010 | Reial | 375/341 |
| 2012/0189083 | A1 * | 7/2012 | Reial | 375/340 |

OTHER PUBLICATIONS

Reddy, Sharath B. et al., "An Efficient Blind Modulation Detection Algorithm for Adaptive OFDM Systems", 2003 IEEE 58h Vehicular Technology Conference (VTC 2003-Fall), vol. 3, Oct. 6-9, 2003, pp. 1895-1899.

* cited by examiner

*Primary Examiner* — Erin File
(74) *Attorney, Agent, or Firm* — Murphy, Bilak & Homiller, PLLC (57) ABSTRACT

According to the teachings herein, one or more signal parameters for received data symbols are estimated by determining a statistical representation for the data symbols based on the magnitude distribution of initial symbol estimates. The statistical representation is compared to a number of reference representations that were formed in like manner from respective sets of data symbols parameterized according to the signal parameters to be estimated for the received data symbols, or according to signal parameters from which the parameters of interest can be derived. Basing the comparison on symbol magnitude distributions provides robust operation at low symbol qualities. Further, one or more embodiments disclosed herein increase the estimation robustness by using a pilot-assisted approach, whereby the reference representations used in the comparison are selected from a larger set in dependence on a quality range estimated from reference symbols received in conjunction with the data symbols of interest.

26 Claims, 6 Drawing Sheets

METHOD AND APPARATUS FOR SIGNAL PARAMETER ESTIMATION

TECHNICAL FIELD

The present invention generally relates to wireless communications, and particularly relates to signal parameter estimation in a wireless communication receiver.

BACKGROUND

In wireless receivers, the received signals are typically down-converted, sampled and A/D converted for digital processing. Samples from several signal sources—e.g., from multiple antennas, despreader delays, etc.—may be combined to create initial estimates of received symbols. These initial symbol estimates may then be demodulated, based on extracting soft bit values. Message decoding then operates on the soft values. Alternatively, the initial symbol estimates are used to form soft symbol estimates, where those values are then used to regenerate corresponding parts of the received signal directly, without decoding. That is, in some cases, the data symbols represent interfering signals to be removed from the composite received signal using some form of interference cancellation or IC.

In order to accurately extract soft values or generate soft symbol estimates from the initial symbol estimates, the receiver must know or must be able to reliably estimate signal parameters like transmitted constellation point scaling and impairment component variance in initial received symbol estimates, or their Signal-to-Interference-plus-Noise Ratio, SINR. In traditional scenarios where the SINR values of the received data symbols are relatively high, a two-step process may be used. First, the scaling of the transmitted modulation constellation point is determined, such as by separating the real and imaginary parts of the initial received symbol estimates and estimating the mean of the magnitudes of these real and imaginary parts. The interference plus noise or impairment power is then obtained as the difference between the total symbol power and the signal power as inferred from the scaling estimate. If necessary, the SINR may be estimated in a straightforward manner.

However, the above parameter estimation process, as well as subsequent processing, assumes actual knowledge of the signal format, such as knowledge of the modulation format used in the transmission of the involved data symbols. For signals targeted to the receiving wireless device, the signal format is typically known, such as from downlink control signaling from a network node such as a base station. However, when the receiver is processing signals not targeted to it, e.g., interfering other-cell downlink signals, some signal format aspects may be unknown and require estimation.

For example, in the context of the above processing approach, the receiver might estimate the modulation format associated with received interfering symbols by first quantizing the initial symbol estimates according to different modulation format (and corresponding modulation constellation) hypotheses—e.g., QPSK (quadrature phase shift keying), 16QAM and 64QAM (quadrature amplitude modulation) hypotheses. The receiver would then select the constellation that minimizes a metric, such as the minimum mean square error (MMSE) or mean Euclidean distance between the initial symbol estimates and the quantized symbol values. Signal scaling and impairment power or SINR would then be estimated as previously described.

An example extension of this approach appears in the paper "An Efficient Blind Modulation Detection Algorithm for Adaptive OFDM Systems," by Reddy, et al., IEEE 58th Vehicular Technology Conference, VTC 2003-Fall, Volume: 3, pp. 1895-1899. According to that paper, a receiver blindly estimates the modulation scheme associated with received symbols using a Kullback-Leibler distance algorithm that operates on the distribution of residual errors between the received symbols and the possible symbols values contained in the defined modulation schemes. By taking the K-L distances to approximating, predefined probability density functions that correspond to different signal-to-noise ratios, SNRs, the transmitted SNR can be estimated. In turn, the transmitted SNR is used to infer the modulation scheme used by the transmitter.

Such approaches work well for medium-to-high symbol SINR scenarios, and they are usable down to around +3 . . . 0 dB symbol SINR, although with increasing performance degradation. Those SINR values represent the typical lower range of the operating region with respect to receiving link-adapted own-cell signals in a wireless communication network. However, approaches that use symbol residuals for parameter estimation become problematic at lower SINRs because the modulation format effects are effectively lost at lower SINRs since the level of the impairment component dominates over the signal of interest.

Thus, it is recognized herein that there is a need for an approach to signal parameter estimation, e.g., for received interfering symbols, that yields robust performance in low SINR conditions.

SUMMARY

According to the teachings herein, one or more signal parameters for received data symbols are estimated by determining a statistical representation for the data symbols based on the magnitude distribution of initial symbol estimates. The statistical representation is compared to a number of reference representations that were formed in like manner from respective sets of data symbols parameterized according to the signal parameters to be estimated for the received data symbols, or according to signal parameters from which the parameters of interest can be derived. Basing the comparison on symbol magnitude distributions provides robust operation at low symbol quality. Further, one or more embodiments disclosed herein increase the estimation robustness by using a pilot-assisted approach, whereby the reference representations used in the comparison are selected or chosen from a larger set in dependence on a quality range estimated from reference symbols received in conjunction with the data symbols of interest.

In an example embodiment, a method of received signal processing in a wireless communication apparatus includes receiving a wireless communication signal, generating initial symbol estimates for data symbols received in a first signal component of the wireless communication signal, and forming a statistical representation of symbol magnitudes of the initial symbol estimates. Example statistical representations include a histogram representing the Probability Density Function, PDF, of the symbol magnitudes in the real and imaginary dimensions. The method further includes comparing the statistical representation to a number of reference representations, to obtain comparison results with respect to each reference representation.

Here, each reference representation represents a characteristic symbol magnitude distribution for data symbols that are jointly parameterized according to a particular combination of defined values for two or more signal parameters from among a defined set of signal parameters. The defined set of signal parameters includes any two or more of a symbol modulation format, a received symbol quality, a symbol scaling factor, a symbol impairment variance estimate, and Multiple-Input-Multiple-Output, MIMO, symbol precoding weights. Correspondingly, the method includes estimating one or more signal parameters for the data symbols from among the defined set of signal parameters, based on evaluating the comparison results, and processing the initial symbol estimates as a function of the estimated one or more signal parameters.

In another example embodiment, a wireless communication apparatus is configured for operation in a wireless communication network and it includes receiver circuitry configured to receive a wireless communication signal, along with a processing circuit operatively associated with the receiver circuitry. The processing circuit is configured to generate initial symbol estimates for data symbols received in a first signal component of the wireless communication signal, and to form a statistical representation of symbol magnitudes of the initial symbol estimates. Further, the processing circuit is configured to compare the statistical representation to a number of reference representations, to obtain comparison results with respect to each reference representation. The reference representations are as described above.

The processing circuit is further configured to estimate one or more signal parameters of interest for the data symbols based on evaluating the comparison results, and to process the initial symbol estimates as a function of the estimated one or more signal parameters. In one example, the signal parameter or parameters of interest for the received data symbols are at least some of the same parameters against which the reference representations are parameterized. Thus, the known values of those parameters as taken from the best-matching reference representation can be taken as the estimated signal parameters of the received data symbols. In other instances, the one or more signal parameters of interest for the received data symbols are derived from the known values of the signal parameters taken from the best-matching reference representation.

In another embodiment, a non-transitory computer-readable medium stores a computer program comprising program instructions for execution by a processing circuit of a wireless apparatus that is configured for operation in a wireless communication network. The computer program includes program instructions that cause the wireless apparatus generate initial symbol estimates for data symbols received in a first signal component of a received wireless communication signal, form a statistical representation of symbol magnitudes of the initial symbol estimates, and compare the statistical representation to a number of reference representations, to obtain comparison results with respect to each reference representation.

The reference representations are as described above, and the computer program includes program instructions to cause the apparatus to estimate one or more signal parameters for the data symbols, based on evaluating the comparison results, and to process the initial symbol estimates as a function of the estimated one or more signal parameters. Such instructions may include instructions to cause the apparatus to use the initial data symbol estimates in interference cancellation processing or joint data detection processing.

Of course, the present invention is not limited to the above features. Those of ordinary skill in the art will recognize additional features and the advantages upon reading the following detailed description, and upon viewing the accompanying drawings.

DETAILED DESCRIPTION

Figure 1:
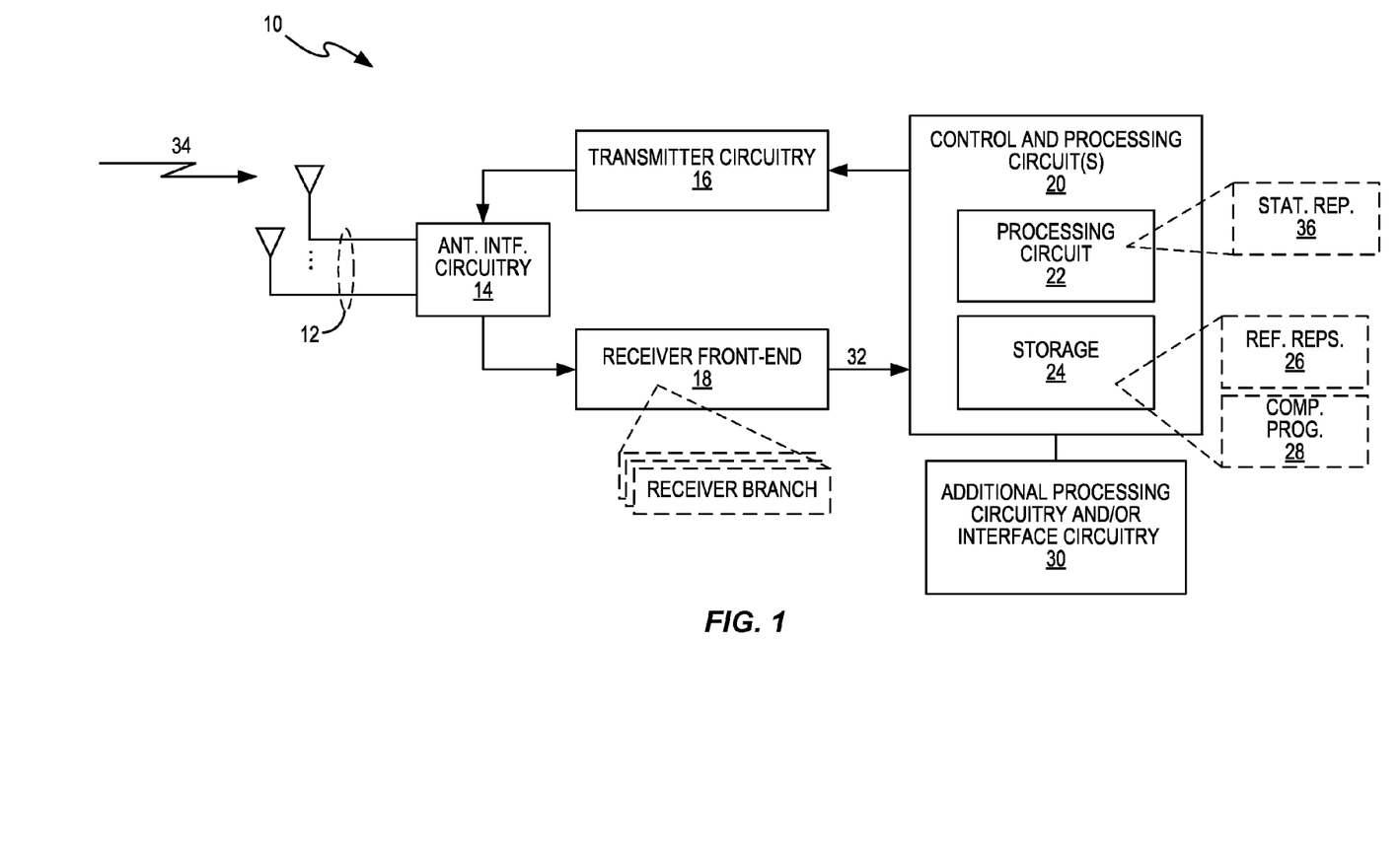
FIG. 1 is a block diagram of one embodiment of a wireless communication apparatus.

FIG. 1 illustrates one embodiment of a wireless communication apparatus 10, hereafter referred to as "apparatus 10". According to the teachings herein, the apparatus 10 is configured to implement received signal processing whereby it reliably estimates one or more signal parameters for received data symbols, such as for use in interference-cancelation processing, according to an advantageous technique that is robust with respect to the lower signal quality ranges that often attend the reception of other-cell interfering signals in a wireless communication network.

By way of non-limiting example, the apparatus 10 is a 3GPP user equipment or UE, where "3GPP" denotes the Third Generation Partnership Project. More generally, the apparatus 10 is any wireless communication device or system that includes a radio transceiver configured for operation in a wireless communication network, such as a cellular communication network based on one or more of the Radio Access Technologies, RATs, defined in the various 3GPP standards. Such RATs include e.g. High Speed Downlink Packet Access (HSDPA), High Speed Packet Access (HSPA), Wideband Code Division Multiple Access (WCDMA) and Long Term Evolution (LTE).

The example apparatus 10 includes one or more receive/transmit antennas 12, such as may be used for Multiple-Input-Multiple-Output, MIMO, operation, or more generally for diversity reception or transmission. The apparatus 10 includes antenna interface circuitry 14, transmitter circuitry 16, and receiver circuitry 18, which is labeled as a "receiver front-end" and may include two or more receiver "branches". As used herein, a receiver branch may be understood as at least the initial portion of a received signal processing chain that operates on the antenna-received communication signal 34 with respect to a specific receiver antenna 12 and/or with respect to a particular processing delay or multi-path delay component. For example, in a RAKE or other multipath receiver implementation, the apparatus 10 may process the antenna-received wireless communication signal at multiple processing delays, with each receiver branch operating on a different processing delay. In such contexts, the branches in question are often referred to as RAKE "fingers."

The receiver front-end 18 is configured to process the antenna-received wireless communication signal 34 and provide a corresponding signal or signals 32 to control processing circuits 20 that are included in the apparatus 10. The signal(s) 32 are referred to herein as the "received wireless communication signal 32" and in an example case it comprises digitized sample streams obtained by filtering, amplifying, down-converting and digitizing the antenna-received wireless communication signal 34 across two or more antennas 34 and/or two or more processing delays.

The control and processing circuit(s) 20 include a processing circuit 22 and storage element 24, which may be at least partly integrated with the processing circuit 22. The processing circuit 22 comprises fixed circuitry, programmed circuitry, or some mix thereof. By way of non-limiting example, the processing circuit 22 comprises one or more microprocessor-based circuits, one or more Digital Signal Processor, DSP, based circuits, one or more Field Programmable Gate Array, FPGA, circuits, one or more Application Specific Integrated Circuits, ASICs, or other digital processing circuitry. By way of further example, the storage element 24 comprises one or more types of non-transitory computer-readable medium, such as one or more types of memory circuits or other storage devices, with non-limiting examples being SRAM, DRAM, FLASH, EEPROM, etc.

The storage element 24 stores a set of reference representations 26, which are denoted as "REF. REPS." in the diagram. In at least some embodiments, and in dependence on the implementation of the processing circuit 22, the storage element 24 also stores a computer program 28, which comprises computer program instructions that when executed by the processing circuit 22 configures the apparatus 10 to operate according to the signal parameter estimation teachings set forth herein. Further in dependence on its intended use and features, the apparatus 10 includes additional processing circuitry and/or interface circuitry 30.

In one or more embodiments, the apparatus 10 is configured for operation in a wireless communication network—not shown in FIG. 1. Correspondingly, the included receiver circuitry, e.g., the front-end 18, is configured to obtain the wireless communication signal 32, e.g., by receiving and preliminarily processing the incoming antenna-received signal 34. In turn, the processing circuit 22 is operatively associated with the receiver circuitry 18 and is configured to carry out a number of received-signal processing operations on the received wireless communication signal 32.

In particular, the processing circuit 22 is configured to generate initial symbol estimates 52 for data symbols 42 received in a first signal component 40 (see FIG. 2) of the wireless communication signal 32, form a statistical representation 36 of symbol magnitudes of the initial symbol estimates 52, and compare the statistical representation 36 to a number of reference representations 26, to obtain comparison results with respect to each reference representation 26. Each reference representation 26 represents a characteristic symbol magnitude distribution for data symbols that are jointly parameterized according to a particular combination of defined values for two or more signal parameters from among a defined set of signal parameters.

The defined set of signal parameters used to parameterize the reference representations 26 includes any two or more of: a symbol modulation format, a received symbol quality, a symbol scaling factor, a symbol impairment variance estimate, and Multiple-Input-Multiple-Output, MIMO, symbol precoding weights. Here, the precoding weights refer to the per-antenna port weights used at the transmitter to effect directed radiation of transmitted signal in preferred direction(s), e.g. to maximize the received signal quality at the intended receiver. In some systems, precoding may be applied using weight sets from a known codebook. In other words, each reference representation 26 is characteristic of a particular combination of values for two or more of such signal parameters. In an example implementation, each reference representation 26 represents a characteristic symbol magnitude distribution for data symbols having a particular combination of modulation format and signal quality. Here, "signal quality" denotes, for example, a Signal-to-Noise Ratio, SNR, a Signal-to-Noise-plus-Interference Ratio, SINR, or some other similar measurement that reflects the signal level of interest.

The processing circuit 22 is further configured to estimate one or more signal parameters for the data symbols 42, based on the processing circuit 22 evaluating the comparison results. Here, the one or more signal parameters of interest for estimation with respect to the received data symbols 42 are the same as or included among the signal parameters on which the reference representations 26 are parameterized, or are derivable therefrom. For example, assume that the reference representations 26 are parameterized according to two signal parameters, e.g., modulation format and symbol SINR. Each reference representation 26 is therefore parameterized as a function of a unique combination of known signal parameter values—e.g., a particular modulation format and a particular SINR value. Thus, the unknown modulation format and symbol SINR of the data symbols 42 may be estimated as the known modulation format and SINR values associated with the reference representation 26 that most closely corresponds to the statistical representation 36. More generally, the one or more signal parameters estimated for the data symbols 42 can be the same as those used to parameterize the reference representations, or any one or more signal parameters derivable from the parameters used to parameterize the reference representations. In either case, the processing circuit 22 is configured to process the initial symbol estimates 52 as a function of the estimated one or more signal parameters.

Among the various advantages offered by this processing, the foregoing series of processing operations allow the processing circuit 22 to reliably estimate unknown signal parameters, such as modulation format, scaling factor, impairment variance or signal quality, etc., for received data symbols. This advantageous determination of unknown signal parameters is advantageous, where, for example, the data symbols 42 are transmitted on the downlink in one or more cells neighboring a current serving cell of the apparatus 10 in a wireless communication network and hence are interfering data symbols.

In the low-SINR conditions that often apply when processing other-cell interference signals, the scaling, impairment variance, and modulation estimates are depend on each other, and it is difficult or impossible to determine one parameter without benefit of side information about the others. As noted previously, approaches that use symbol residuals for parameter estimation become problematic at lower SINRs because the modulation format effects are effectively lost at lower SINRs, since the levels of the impairment component dominates over the signal of interest. Problematically, with respect to such deficiencies, an error regarding the estimation of one parameter leads to erroneous decisions about the others.

However, as taught herein, the advantageous use of characteristic symbol magnitude distributions, e.g. in the form of magnitude histograms, or higher-order statistics dependent on such distributions, allows the disclosed signal parameter estimation to work well, even when the signal quality of the data symbols 42 is quite low. The advantage is due to the fact that the symbol magnitude distribution incorporates features that are characteristic, for example, of the modulation format, and which are distinguishable down to low signal quality levels.

As mentioned for an example configuration, the storage element 24 stores a set of reference representations 26 in the wireless communication apparatus 10. The reference representations 26 comprise, for example, any one of: symbol magnitude distribution histograms, central moment representations of the symbol magnitude distributions, and other measures quantifying the shape of the symbol magnitude distribution, e.g. the number of modes, skewness, cumulants, and kurtosis values. Further, the reference representations 26 are jointly parameterized as a function of two or more of the above-mentioned signal parameters. For example, each reference distribution 26 is generated from a representative data symbol set having a characteristic pairing of modulation format and signal quality, or a characteristic pairing of modulation format and precoding weights. As such, a series of reference representations 26 could be generated for a given modulation format and a corresponding range of SINR values or other signal quality metrics, with another series generated over the same range(s) of SINR for another modulation format, and so on.

Figure 2:
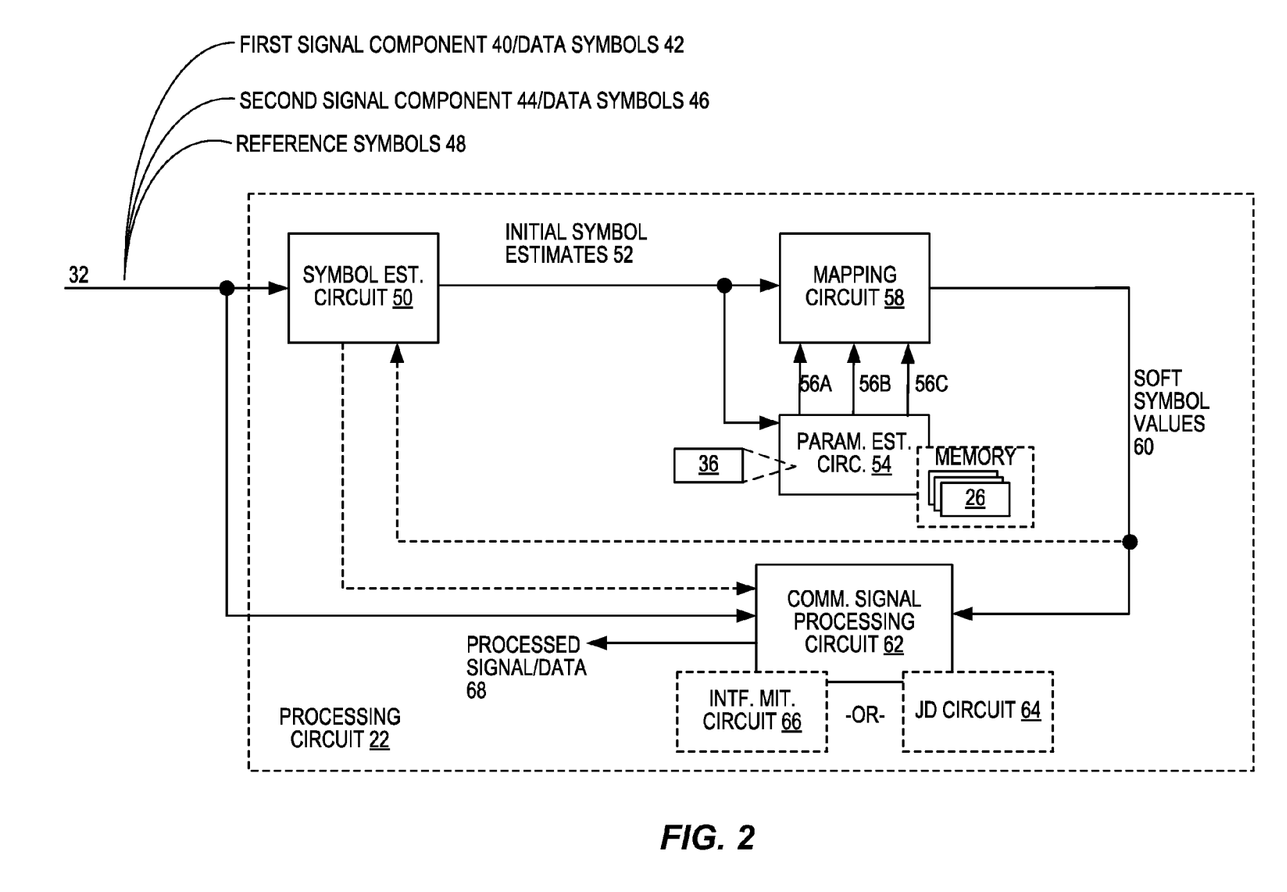
FIG. 2 is a block diagram of example details for a processing circuit within a wireless communication apparatus.

Turning to FIG. 2, one sees an example implementation of the processing circuit 22 with respect to the signal parameter estimation processing taught herein. The received wireless communication signal 32 is a composite of any number of signal components impinging on the receive antenna(s) 12 of the apparatus 10. By way of example, the received wireless communication signal 32 includes a first signal component 40 conveying first data symbols 42, (also referred to simply as "data symbols 42") e.g., interfering symbols transmitted on an other-cell downlink. The received communication signal 32 further includes a second signal component 44 conveying second data symbols 46, e.g., data symbols targeted to the apparatus 10 and transmitted on an own-cell downlink. The second data symbols 46 in this example hence represent desired symbols associated with the data transmission targeted to the apparatus 10. The received communication signal 32 in this example also includes one or more signal components conveying reference symbols 48, e.g., pilot symbols on a Common Pilot Channel, CPICH, or other known reference values, to be used by the apparatus 10 in channel estimation, etc.

In a working sense, the received communication signal 32 as depicted in FIG. 2 comprises, for example, a buffered set of sample values corresponding to a given transmission interval or other defined unit of time. In that manner, the received communication signal 32 is available for signal processing, where such processing may be done serially, e.g., on successively updated version of the signal samples, or values derived therefrom, or in parallel, using more than one copy of the signal samples.

In any case, in the example implementation, the processing circuit 22 includes a symbol estimation circuit 50 that is configured to generate initial symbol estimates 52, corresponding to the unknown first data symbols 42. The processing circuit 22 further includes a parameter estimation circuit 54, which operates on the initial symbol estimates 52 and obtain the one or more estimated signal parameters for the data symbols 42, as described above. That is, the parameter estimation circuit 54 in an example embodiment is configured to form the statistical representation 36 from the initial symbol estimates 52, and to compare the statistical representation 36 to some number of reference representations 26, e.g., stored in a memory or other storage element, and to estimate one or more signal parameters for the data symbols 42, based on the comparison. For example, the signal parameter outputs 56A, 56B and 56C in the diagram correspond to a modulation format estimate, a symbol scaling estimate, and a symbol impairment variance estimate, for the data symbols 42.

A mapping circuit 58 maps the initial symbol estimates 52 into corresponding soft symbol values 60. The mapping is performed in dependence on the one or more signal parameters estimated by the parameter estimation circuit 54 for the data symbols 42. The soft symbol values 60 may be provided to the communication signal processing circuit 62 for decoding and data recovery and/or the soft symbol values 60 may be used for interference cancellation. Note that the second data symbols 46 also may be similarly processed and may be decoded for transmit information recovery, which is denoted as processed signal information or data 68 in the diagram. However, in at least an example case, the second data symbols 46 are targeted to the apparatus 10 and therefore the signal parameters of interest are known to the apparatus 10, or are easily obtainable by it, and the apparatus 10 therefore does not need to perform the same sort of signal parameter estimation at issue with respect to the data symbols 42, where the signal parameters of interest are not known, since they are, for example, interfering symbols transmitted on an other-cell downlink.

The communication signal processing circuit 54 may include an interference mitigation circuit 66 and/or a joint detection circuit 64. For example, the interference mitigation circuit 66, alone or in cooperation with the symbol estimation circuit 50, uses the soft symbols 60 obtained from the initial symbol estimates 52 to cancel interference arising in the received wireless communication signal 32 from the data symbols 42. In this respect, it will be appreciated that the symbol estimation circuit 50 may be configured to produce initial symbol estimates for the second data symbols 46 after modifying buffered signal sample values during interference cancellation with respect to the data symbols 42.

Additionally, or alternatively, the communication signal processing circuit 62 includes a joint detection circuit 64 that is configured to perform joint symbol detection, e.g., joint detection of the data symbols 42 and the second data symbols 46. In the joint detection process, multiple hypotheses are created for the resulting received signal, assuming that certain combinations of data symbols 42 and second data symbols 46 were transmitted. The actual received signal is then compared to the hypothesized received signals and the hypothesis optimizing a chosen metric, e.g. a distance or correlation metric, determines the estimates of data symbols 42 and second data symbols 46 for subsequent processing. In either case, the estimation of the one or more unknown signal parameters for the data symbols 42 as taught herein allows for better soft symbol mapping, particularly under low signal quality conditions for the data symbols 42.

Such signal parameter estimation may also be adapted in a dynamic sense, to better accommodate for actual reception conditions. For example, in at least one embodiment, the processing circuit 22 is configured to estimate one or more reference signal parameters using the reference symbols 48 received in the wireless communication signal 32. This operation includes estimating at least one of a reference symbol impairment variance and a reference symbol quality. Then, based on the estimated one or more reference signal parameters, the processing circuit 22 adapts a count or selection of the reference representations 26 taken from the set of reference representations 26, for use as the number of reference representations 26 to be used in the comparing operation. In other words, from a larger set of reference representations 26 stored in the storage element 24, the processing circuit 22 chooses which ones and/or how many of the reference representations 26 against which it compares the statistical representation 36.

In one example of this approach, the processing circuit 22 takes a subset of reference representations 26 from the larger set in dependence on the SINR or other signal quality metric of the reference symbols. The selected subset corresponds to a signal quality range or threshold represented by the SINR or other signal quality metric. In a particular example, the processing circuit 22 is configured to limit a signal quality range considered in the comparing operation, in dependence on an impairment variance confidence interval that it determines by estimating a reference symbol impairment variance from reference symbols 48, as well as the estimation variance of that estimate. In one embodiment, the confidence interval is expressed as a function of the reference symbol impairment variance and the number of reference symbols used to obtain that estimate.

As an example of such operations, the processing circuit 22 is configured to estimate a reference symbol quality from the reference symbols 48 and scale the reference symbol impairment variance to obtain an estimate of data symbol impairment variance for the data symbols 42. Further, the processing circuit 22 is configured to determine the impairment variance confidence interval from the estimate of data symbol impairment variance, determine a search space within a set of reference representations 26 in dependence on the impairment variance confidence interval, and select, in dependence on the search space, a corresponding subset of reference representations 26 from a larger set of reference representations 26. The processing circuit 22 then uses the selected subset as the number of reference representations 26 used in the comparing operation. Operating on the selected subset may provide at least one of estimation performance improvement or processing complexity reduction.

As for other aspects of the contemplated processing, the processing circuit 22 in at least some embodiments is configured to determine each initial symbol estimate 52 as one or more complex sample values obtained from the wireless communication signal 32 for a corresponding one of the data symbols 42. For example, the processing circuit 22 is configured to determine each initial symbol estimate 52 as a combined value generated for a corresponding one of the data symbols 42. Such processing in one or more embodiments is based on the processing circuit 22 being configured to combine corresponding samples values obtained from the wireless communication signal 32 across at least one of: two or more receiver antennas 12, and two or more multipath components of the wireless communication signal 32.

Further, in at least some embodiments, the processing circuit 22 is configured to calculate a normalization factor for the initial symbol estimates 52. The normalization factor is based on an average amplitude of the real and imaginary parts of the initial symbol estimates 52 or an average power of the initial symbol estimates 52, and the processing circuit 22 uses the normalization factor to normalize the symbol magnitudes used to form the statistical representation 36.

In the same or other embodiments, the processing circuit 22 is configured to compare the statistical representation 36, as formed for the data symbols 42, to each reference representation 26 used in the comparison operation, based on being configured to compute a correlation or distance metric indicating an extent to which the statistical representation 36 matches the reference representation 26. For example, the processing circuit 22 estimates the one or more signal parameters for the data symbols 42 by determining which one of the reference representations 26 considered in the comparison is a best-matching reference representation 26. Best-matching refers to proving the best description of the received data symbols out of all available reference representations; in other words, being closest to the corresponding representation of the received signal according to some metric.

With the best-matching reference representation 26 so identified, the processing circuit 22 takes one or more of the corresponding defined values that were used to jointly parameterize the best-matching reference representation 26 as the one or more estimated signal parameters of the data symbols 42. Additionally, or alternatively, the processing circuit 22 derives the estimated one or more signal parameters of the data symbols 42 from the corresponding defined values. In other words, each reference representation is parameterized according to known values of two or more signal parameters and the known values associated with the best-matching reference representation 26 can be taken as the signal parameter estimates of the data symbols, or such estimates can be derived from those known values.

In one such embodiment, the processing circuit 22 is configured to estimate the one or more signal parameters of the data symbols 42 by jointly estimating a symbol scaling factor and a symbol impairment variance for the data symbols 42. Correspondingly, the processing circuit 22 is configured to process the initial symbol estimates 52 as a function of the estimated one or more signal parameters, based on computing the soft symbol values 60 corresponding to the initial symbol estimates 52 in dependence on the estimated symbol scaling factor and the estimated symbol impairment variance. As noted, in one or more implementations, the processing circuit 22 is configured to use such soft symbol values 60 to cancel interference in the wireless communication signal 32 arising from the data symbols 42.

In another contemplated embodiment, a non-transitory computer-readable medium, such as the storage element 24, stores a computer program 28 that includes program instructions for execution by a processing circuit 22 of an apparatus 10 that is configured for operation in a wireless communication network (see FIG. 1). Execution of the computer program instructions configures the apparatus 10 to carry out a number of signal processing operations. In particular, the computer program 28 includes program instructions causing the apparatus 10 to: generate initial symbol estimates 52 for data symbols 42 received in a first signal component 40 of the wireless communication signal 32, form a statistical representation 36 of symbol magnitudes of the initial symbol estimates 52, and compare the statistical representation 36 to a number of reference representations 26 to obtain comparison results with respect to each reference representation 26.

Still further, the computer program 28 includes program instructions causing the apparatus 10 to estimate one or more signal parameters for the data symbols 42, based on evaluating the comparison results, and to process the initial symbol estimates 52 as a function of the estimated one or more signal parameters. Such processing may include canceling or otherwise mitigating interference in the received wireless communication signal 32 that arises from the data symbols 42.

Figure 3:
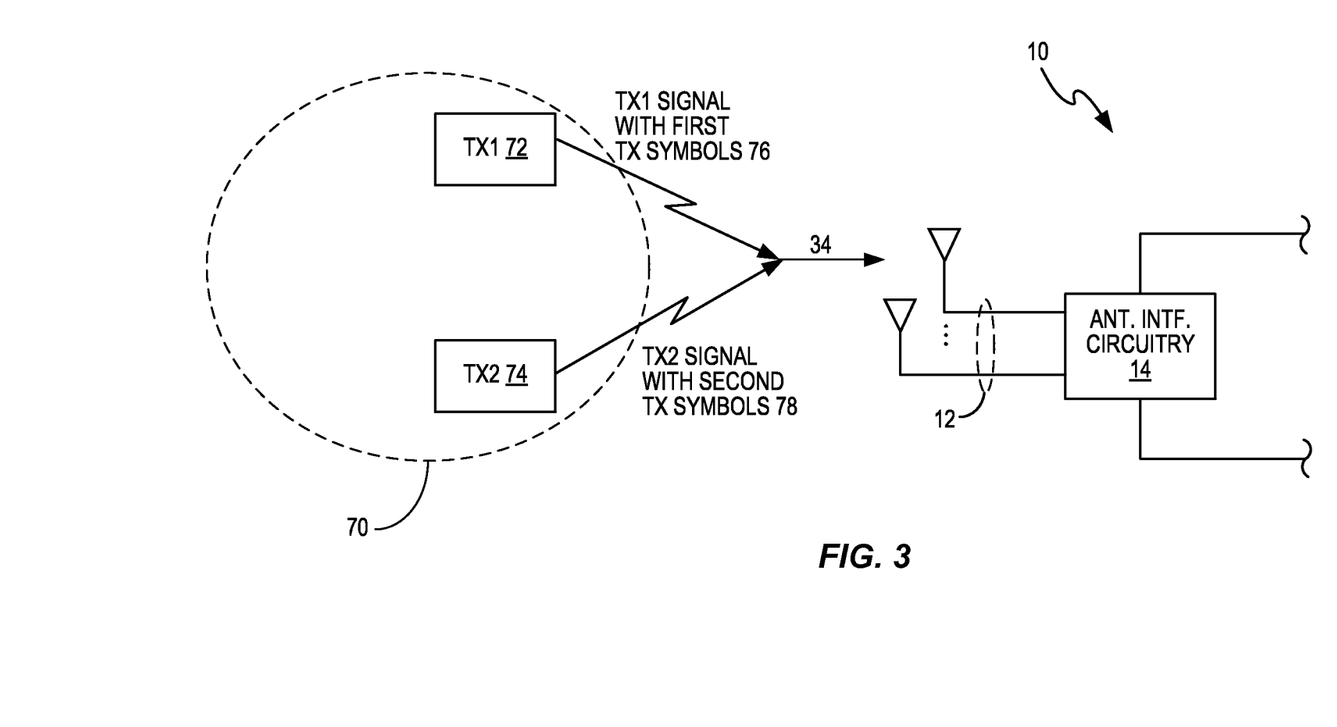
FIG. 3 is a block diagram of one embodiment of a wireless communication network, shown in simplified form with respect to corresponding composite signal reception at a wireless communication apparatus.

In an interference cancelation example, FIG. 3 provides a simplified depiction of a wireless communication network 70, which includes a first transmitter 72, TX1 in the diagram, and a second transmitter 74, TX2 in the diagram. The transmitters 72 and 74 are, for example, network base stations that each transmit downlink signals in a respective cell of the network 70. One may assume that the TX1 transmitter 72 provides a TX1 downlink signal with first data symbols 76, and that the TX2 transmitter provides a TX2 downlink signal with second data symbols 78. In the context of the earlier discussion, one may assume that the first data symbols 76 (corresponding to first data symbols 42 in FIG. 2) are unwanted interfering symbols transmitted in a cell neighboring the one in which the desired second data symbols 78 (corresponding to second data symbols 46 in FIG. 2) are transmitted. Such transmissions combine to form the aforementioned composite signal 34, which impinges on the receive antenna(s) 12 of the apparatus 10.

Figure 4:
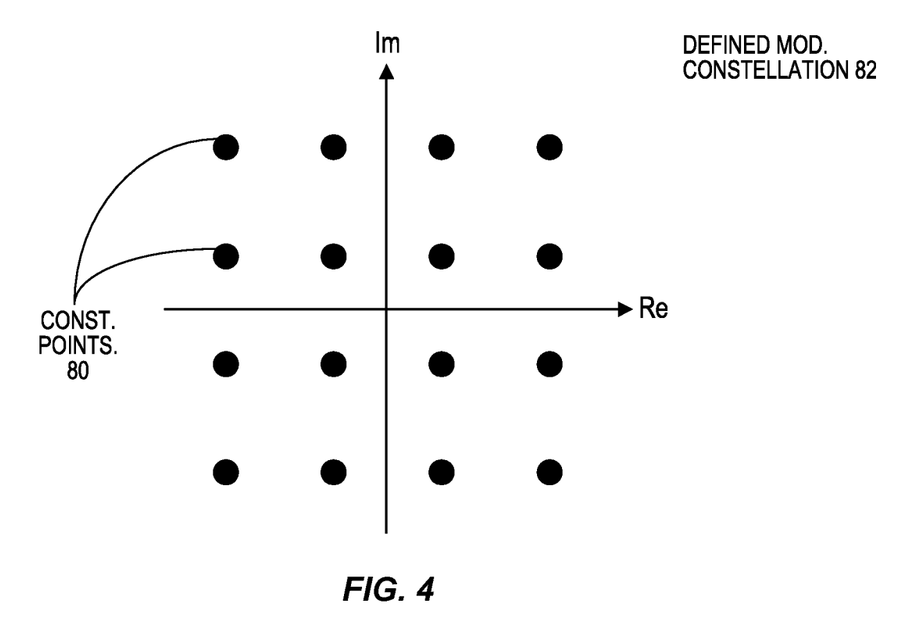
FIG. 4 is a plot of a known signal modulation constellation comprising a number of constellation points, such as may be used by a communication transmitter to generate data symbols for transmission.

FIG. 4 provides an example plot of constellation points 80 in a defined modulation constellation 82. Those of ordinary skill in the art will appreciate that different modulation formats have different characteristic modulation constellations 82 and correspondingly different arrays or positioning of included constellation points. One of the several advantages gained through implementation of the signal parameter estimation teachings presented herein is the ability to accurately estimate the modulation format of data symbols, e.g., the example data symbols 42, even when such symbols are received at low signal quality. That ability derives in part from the advantageous use of statistical representations for the received symbols and for the "reference" symbols sets that depend on the symbol magnitudes, because the symbol magnitude distributions retain the distinguishing characteristics of the different modulation formats, e.g. the number of modes in the distribution, even at low levels of signal quality for the symbols in question.

For example, in at least some embodiments, each reference representation 26 is a histogram of the symbol magnitude distribution characteristic for data symbols having a particular combination of values for the signal parameters used to parameterize the reference representations 26. In one case, each reference representation 26 corresponds to a particular modulation format and a particular signal quality level or range. Correspondingly, the processing circuit 22 forms the statistical representation 36 of the unknown data symbols 42 in the same manner, i.e., as a histogram of the symbol magnitudes of the data symbols 42. Such magnitudes may represent the real part magnitude and the imaginary part magnitude, for complex-valued symbols. By comparing the histogram formed for the received data symbols 42 against some or all of the stored reference histograms, the processing circuit 22 identifies the best-matching histogram and takes the modulation format and signal quality associated with that stored histogram as being the best estimates of the modulation format and signal quality of the received data symbols 42.

Figure 5:
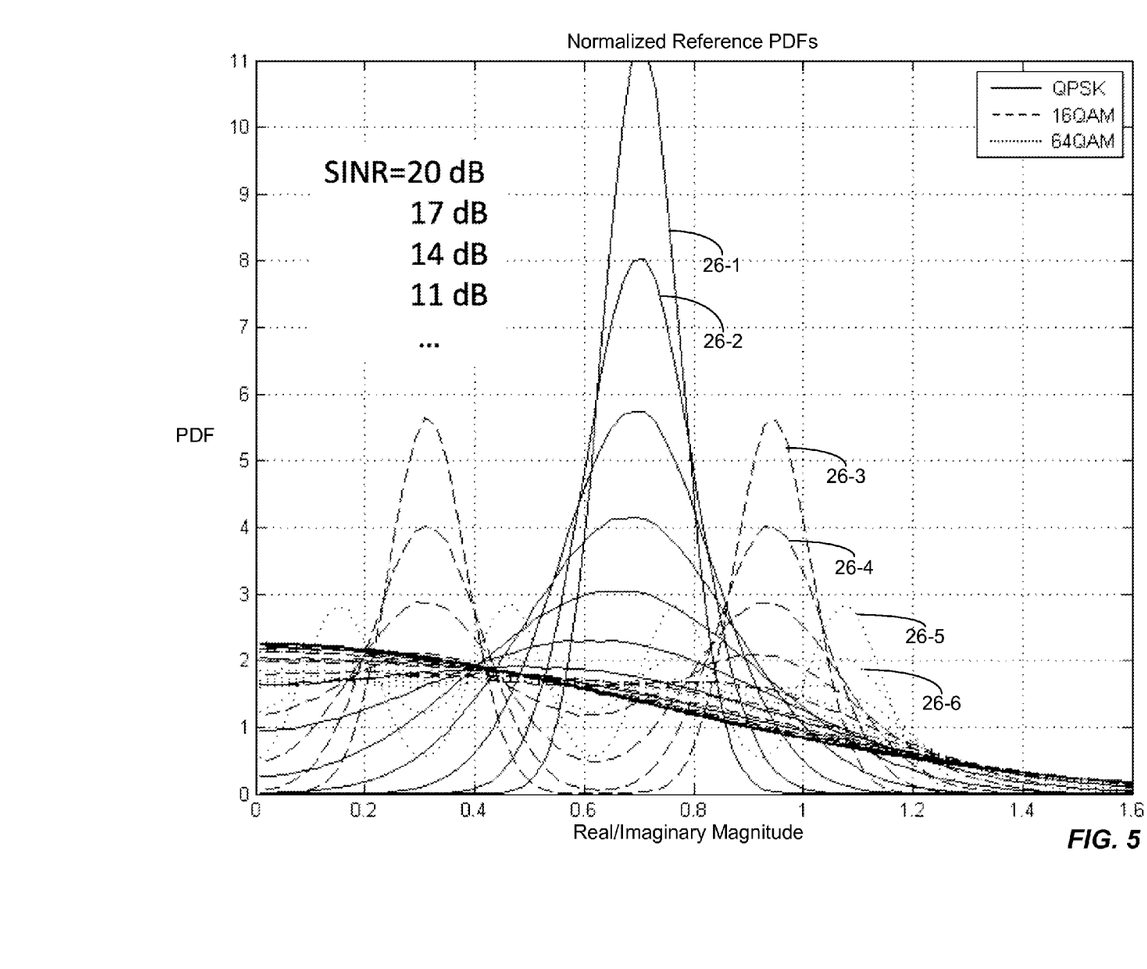
FIG. 5 is a plot of example reference representations, depicted as families of curves, where each family of curve represents the characteristic symbol magnitude distribution seen over a given symbol quality range for data symbols having a given modulation format.

FIG. 5 illustrates a plot of such an arrangement. In particular, one sees a family of curves, e.g., 26-1 and 26-2, representing the characteristics symbol magnitude distributions (probability density functions, PDF) for data symbols of having QPSK modulation. The QPSK curves differ as a function of received symbol SINR. Another family of curves 26-3 and 26-4 is shown for 16QAM, and yet another family 26-5 and 26-6 is shown for 64QAM. These are, of course, merely example plots, and it is contemplated herein that other signal parameters, such as MIMO precoding weights, may be used to develop characteristic probability density functions (PDF) or histograms, to be used in accordance with the teachings herein. While FIG. 5 plots PDFs, those of ordinary skill in the art will understand that a histogram represents a coarse or quantized-axis version of a PDF. For example, a histogram would define bins along the magnitude axis for collecting sample occurrences of magnitude values.

One important observation regarding the example plots of FIG. 5 is that the hypothesis-dependent reference histograms represented by each family of curves exhibits in a pronounced way the characteristic shapes associated with the different modulation formats at issue. As such, this example set of reference representations 26 provides a robust mechanism for recognizing the modulation format of the received data symbols 42.

Figure 6:
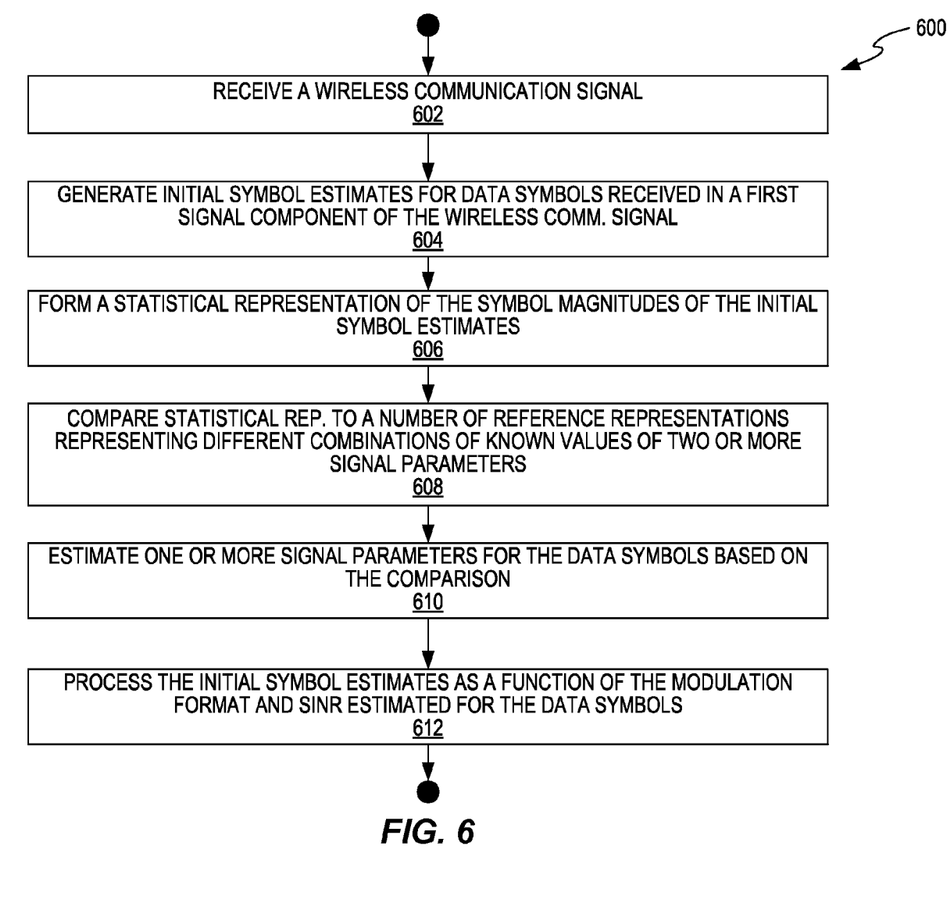
FIG. 6 is a logic flow diagram of one embodiment of a method of processing at a wireless communication receiver.

FIG. 6 illustrates an example method 600, such as may be implemented by the apparatus 10 introduced in FIG. 1. Certain steps of the method 600 may be performed in an order other than that suggested by the diagram, or may be performed in parallel with other steps. Moreover, the processing represented by the diagram may be performed as part of overall received signal processing operations, which may include operations not shown or discussed. Finally, the method 600 may be performed on recurring basis, such as for multiple signal components in a received wireless communication signal 32, or repeated whenever new data is received.

With the above qualifications in mind, the method 600 includes receiving (Block 602) a wireless communication signal 32, generating (Block 604) initial symbol estimates 52 for data symbols 42 received in a first signal component 40 of the wireless communication signal 32, and forming (Block 606) a statistical representation 36 of symbol magnitudes of the initial symbol estimates 52. The method 600 further includes comparing (Block 608) the statistical representation 36 to a number of reference representations 26, to obtain comparison results with respect to each reference representation 26.

As detailed earlier, each reference representation 26 represents a characteristic symbol magnitude distribution for data symbols that are jointly parameterized according to a particular combination of defined values for two or more signal parameters from among a defined set of signal parameters. The defined set includes, for example, any two or more of a symbol modulation format, a received symbol quality, a symbol scaling factor, a symbol impairment variance estimate, and Multiple-Input-Multiple-Output, MIMO, symbol precoding weights. Correspondingly, the method 600 further includes estimating (Block 610) one or more signal parameters for the data symbols 42, based on evaluating the comparison results, and processing (Block 612) the initial symbol estimates 52 as a function of the estimated one or more signal parameters. Such processing includes, for example, performing interference cancelation with respect to the data symbols 42 or performing joint detection using the data symbols 42.

As a more detailed example, in one embodiment, scaling, variance, and optionally modulation parameters for a set of data symbols 42 are estimated jointly, based on the magnitude distribution of the symbol estimates. These estimations are performed using the initial symbol estimates 52, which are also referred to as "combined symbol estimates" in embodiments where such estimates are formed as a combination of values taken across receiver branches, e.g., across antennas, processing delays, etc.

The initial symbol estimates are separated into real and imaginary parts and their magnitude probability density function, PDF, is estimated. A histogram representing this observed PDF is then compared to a set of pre-computed reference histograms that correspond to different combinations of scaling and impairment variance (and optionally modulation format) values. That is, the statistical representation 36 is a histogram of symbol magnitude distribution for the initial symbol estimates 52, and the reference representations are corresponding symbol magnitude distribution histograms for sets of data symbols parameterized according to defined combinations of values for scaling, impairment variance and, optionally, modulation format. The parameters associated with the reference representation 26 that optimizes a predetermined metric, such as PDF correlation or a distance metric, are then used as the one or more signal parameters being estimated for the data symbols 42.

In another, more detailed example, a set of reference PDFs is computed for different symbol SINR and modulation format combinations. Such processing is done, for example, by computer-generating a large set of complex values that mimic received symbol values in a wireless communications receiver for certain modulation and SINR conditions. The complex values are normalized and separated into real and imaginary components. Exemplary normalization factors are discussed below. The magnitude PDF of the real-valued per-dimension quantities is then estimated, e.g., by computing and appropriately normalizing the corresponding histogram. The PDF is then stored, e.g., in the storage element 24, for on-line use as one among a set of reference PDFs, i.e., as one of the reference representations 26.

In live operation, the apparatus 10 obtains the initial symbol estimates 52 from a demodulation and combining stage, for example, using direct sequence (DS)-CDMA or orthogonal frequency multiplex (OFDM) signal processing circuitry, as appropriate for the RAT associated with the communication signal 32. The initial symbol estimates 52 are normalized and separated into their real and imaginary components. The magnitude PDF of the real-valued per-dimension quantities is estimated, e.g., by computing and appropriately normalizing their histogram. The obtained PDF is then compared to the set of pre-computed reference PDFs that correspond to different combinations of SINR and modulation settings. The SINR and modulation parameters associated with the reference PDF that yields the best metric value are then used as signal parameter estimates for the initial symbol estimates 52 in subsequent processing. Given the SINR value and the applied normalization scaling above, the signal scaling and impairment power values are obtained in a straightforward manner according to the teachings herein.

The predetermined metric used for evaluating the parameter hypotheses may be, for example, a correlation metric representing the correlation between the observed and the reference PDF, where the maximum value indicates the best match, or a distance metric, such as a squared distance between the observed and reference PDFs or a Euclidean distance between the, where the minimum value indicates the best match. Here, the parameter hypotheses are the known parameter values used to generate each reference representation 26 as one of the reference PDFs, and the observed PDF is, of course, the statistical representation 36 determined from the initial symbol estimates 52.

In some embodiments, the modulation information for the data symbols 42 is available a priori, e.g., it is known by the apparatus 10 that only QPSK modulation is used. Then only the known modulation format is used when generating the reference PDFs, or only the subset of reference PDFs corresponding to the known modulation format is invoked in the joint detection process—i.e., only those reference representations 26 matching the known modulation format are used for comparison to the statistical representation 36 obtained from the initial symbol estimates 52.

This contemplated method extends the ability to estimate the symbol SINR to lower symbol SINR operating points, compared to the current state of the art receivers. However, beyond some lower threshold of SINR values, reference PDFs based on power-normalized symbol estimates may become indistinguishable, because the impairment (interference and/or noise) component hides any signal component present. This possibility may be problematic if subsequent processing is sensitive to SINR over-estimation. Thus, an apparatus 10 as contemplated herein may be configured to improve its robustness in parameter estimation, by reporting a predetermined low SINR value, unless the computed metric for some higher SINR hypothesis exceeds the computed metric for the predetermined low SINR by a predetermined margin.

In an example implementation, the reference representations are parameterized as a function of received symbol SINR, e.g., they are jointly parameterized according to combinations of modulation formats and SINR values, such that each one represents a different combination of modulation format and SINR. Correspondingly, the apparatus 10 determines an initial estimate of SINR based on a received pilot signal, e.g., as represented by the reference symbols 48 in FIG. 2, and obtains an estimated SINR range based on the initial SINR estimate. Then, the apparatus 10 uses the estimated SINR range to select or choose a subset of reference representations 26 from a larger, complete set of reference representations 26 spanning a wider SINR range. The selected subset is used for estimating the one or more signal parameters of interest for the received data symbols 42.

Estimating the one or more signal parameters according to this approach can be understood as a "joint" estimation process in the sense that the reference representations 26 are jointly parameterized according to SINR and modulation format, thus finding the best-matching reference representations simultaneously yields the modulation format estimate and the symbol SINR estimate for the received data symbols 42. The same is true if the reference representations are jointly parameterized with additional or alternative parameters, such as MIMO precoding weights, etc.

In general, pilot-assisted approaches are applicable to communication systems where reference symbols are available that reflect an interference background that is comparable to that experienced by the received data symbols 42. In such cases, the impairment power for the received data symbols 42 may be approximately estimated from the received pilots or other such reference symbols, RS. This RS-based impairment power value may then be used by the apparatus 10 at least in lower SINR conditions, to guarantee the robustness of the joint parameter estimation process taught herein for estimating the one or more signal parameters of interest for the received data symbols 42. Example reference symbols include pilot symbols in common pilot channel (CPICH) in High Speed Downlink Packet Access, HSDPA, systems, or non-colliding Cell-specific Reference Signals (CRS), in Long Term Evolution, LTE, systems.

The RS magnitude may be estimated reliably by applying at least temporal averaging, based on the transmitted RS power from a cell being constant over time. The apparatus 10 can therefore obtain substantially unbiased impairment power estimates from the RSs, after removing the known RS component. Note that the time and/or frequency span of the RSs used must coincide with the span of the received data symbols 42. However, the number of RSs available in a limited span often results in high estimation variance for the impairment power parameter.

Thus, instead of using the impairment power estimate directly, the apparatus 10 in at least some embodiments computes the confidence interval corresponding to a certain desired confidence level, e.g. 95%. Once the impairment variance bounds are known, the apparatus 10 limits the reference representations 26, e.g., reference PDFs, that it considers in its comparison operations to only those hypotheses corresponding to symbol SINR values that are consistent with the bounds.

In the interest of providing further example processing details, one may assume that the apparatus 10 is a blind IC receiver configured for operation in an HSDPA system. The signal parameter estimation techniques taught herein are thus applied to the estimation of one or more signal parameters for received data symbols 42 from HS-PDSCH code 1, as transmitted from interfering cell n. Here, HS-PDSCH denotes the High Speed Physical Downlink Shared Channel used in the HSDPA downlink for user data transmissions.

First, the apparatus 10 despreads and combines CPICH symbols, at time instants k=1 ... $N_p$, where $N_p$ is the total number of available CPICH symbols, to obtain vectors $x_{p,k}^{(n)}$, containing per-receiver branch symbol estimates. It then generates combined pilot symbols $\hat{s}_{p,k}^{(n)}$ by combining the per-receiver branch symbol estimates using combining weights $w^{(n)}$ according to:

$$\hat{s}_{p,k}^{(n)} = w^{(n)H} x_{p,k}^{(n)}$$

The combining weights $w^{(n)}$ are used for producing the initial data symbol estimates 52 in FIG. 2, denoted here as $\hat{s}_m^{(n,l)}$, are used for estimating the pilot symbol variance in the next step. Thus, where the initial symbol estimates 52 are formed via multi-branch combining using weights $w^{(n)}$, the combined pilot symbols $\hat{s}_{p,k}^{(n)}$ are formed using the same weights. The superscript n denotes a transmission slot or transmission time interval or subframe index.

Second, the apparatus 10 estimates pilot symbol variance:

$$\sigma_p^2 = \frac{1}{N_p - 1} \sum_{k=1}^{N_p} |\hat{s}_{p,k}^{(n)} - w^{(n)H} h^{(n)} s_{p,k}|^2$$

where $s_{p,k}$ are the known values of the transmitted pilot symbols.

Third, to scale to obtain an estimate of the impairment variance for the data symbols 42, the apparatus 10 computes:

$$\sigma_{init}^2 = \frac{SF_{HS-PDSCH}}{SF_{CPICH}} \sigma_p^2$$

where the spreading factor, SF, values in the above equation equal 16 and 256, for HS-PDSCH and CPICH in HSDPA, respectively.

Fourth, the apparatus 10 determines the impairment variance confidence interval (for 95%, η=1.96):

$$\sigma_{min}^2 = \sigma_{init}^2 \left(1 - \frac{\sqrt{2}\eta}{N_p}\right),$$

and $$\sigma_{max}^2 = \sigma_{init}^2 \left(1 + \frac{\sqrt{2}\eta}{N_p}\right).$$

Here, η is a confidence parameter associated with the desired probability of the confidence interval. If the apparatus 10 adopts a 1 dB search resolution for SINR or symbol impairment variance and $N_p$=10, it obtains a robust confidence interval of ±2 dB around the data symbol variance estimate $\tau_{init}^2$.

Fifth, the apparatus 10 computes the estimated average received symbol power, $$P_t = \frac{1}{N_s} \sum_{m=1}^{N_s} |\hat{s}_m^{(n,l)}|^2,$$

where $N_s$ is the total number of available data symbols and $\hat{s}_m^{(n,l)}$ are the initial symbol estimates 52, representing the data symbols 42.

Sixth, the apparatus estimates a data symbol estimate normalization factor γ, where γ may be determined in different ways. In a first exemplary embodiment, the normalization factor is calculated as the average per-dimension amplitude:

$$\gamma = \frac{1}{2N_s} \sum_{m=1}^{N_s} \left(|\text{Re}\{\hat{s}_m^{(n,l)}\}| + |\text{Im}\{\hat{s}_m^{(n,l)}\}|\right).$$

In a second exemplary embodiment, the normalization factor is calculated as the square root of the estimated average symbol power:

$$\gamma = \sqrt{P_t}.$$

Seventh, the apparatus 10 forms a vector (1×2$N_s$) of normalized per-dimension pulse amplitude modulation, PAM, symbol magnitudes:

$$c = \frac{1}{\eta}\left[|\text{Re}(\hat{s}_1^{(n,l)})||\text{Im}(\hat{s}_1^{(n,l)})| \ldots |\text{Re}(\hat{s}_{N_s}^{(n,l)})||\text{Im}(\hat{s}_{N_s}^{(n,l)})|\right].$$

Eighth, the apparatus 10 computes a magnitude histogram of the PAM magnitudes:

$$H = \text{hist}(c, d)$$

where d is a set of histogram bin boundaries. This step can be understood as one example of how the apparatus 10 computes the statistical representation 36.

Ninth, the apparatus 10 determines the modulation format and SINR of the received data symbols 42 by minimizing a distance metric to the reference histograms. Here, the reference histograms, i.e., the reference representations 26, are parameterized jointly according to modulation format and symbol SINR, such that each one represents a different modulation and SINR hypothesis for the received data symbols 42. The determination may be represented as:

$$\{M_l^{(n)}, \text{SINR}_l\} = \arg_u \min D(H, H_{ref}(\{M, \text{SINR}\}_u))$$

where $H_{ref}$ are pre-computed histograms for different hypothesized combinations of a certain modulation format M and symbol SINR. The hypothesis index u enumerates the search space that typically spans three different PAM format assumptions and, for example, five SINR values for a total of 3×5=15 hypotheses. $M_l^{(n)}$ denotes the selected modulation format as the result of the determining. The tested SINR range in this example is $$\left[\frac{P_t}{\sigma_{init}^2} - 1\right]_{dB} \pm 2 \text{ dB},$$

determined by the variance confidence interval [$\sigma_{min}^2$, $\sigma_{max}^2$]. In other words, the apparatus 10 uses the calculated confidence interval to limit the SINR range considered in the comparison.

Tenth, the apparatus 10 extracts signal variance and scaling estimates, respectively expressed as:

$$\sigma^2 = \frac{P_t}{1+SINR_t},$$

and $$A_t^{(n)} = \sqrt{P_t - \sigma^2}.$$

Thus, in this example, the one or more signal parameters estimated for the data symbols 42 include the symbol scaling factor $A_t^{(n)}$ and the symbol impairment variance estimate $\sigma^2$. The parameter estimation circuit 54 shown in FIG. 2 may be configured to produce these estimates, for use by the symbol mapping circuit 58 in producing the soft symbol values 60 from the initial symbol estimates 52.

While the above detailed analysis focuses on the HSPA downlink, the teachings are more broadly applicable. For example, the disclosed processing may be applied in the HSPA uplink, and to the uplink and downlink in LTE.

Further, in some implementations, the received data symbols 42 may include additional unknown parameters, e.g., MIMO precoding weights. The teachings herein can be used to determine the most likely precoding format applied to given received data symbols 42, based on the reference representations 26 being parameterized as a function precoding weights.

Alternatively, when the initial symbol estimates 52 are obtained by combining values across receive antennas, processing delays, etc., several versions of the combining weights $w^{(n)}$ may be used for producing the combined data symbols $\hat{s}_m^{(n,l)}$. Each such version assumes one of the possible precoding formats. A statistical representation 36 of the initial symbol estimates 52 may be determined for each weight formulation. The precoding format leading to the highest estimated SINR, or to SINR values exceeding a threshold, and associated parameter estimates are reported for subsequent processing.

As noted, the teachings herein may be advantageously used for processing other-cell signals, particularly in case where the symbol SINR may become so low that traditional parameter estimation approaches work poorly. Although representing a non-limiting context, the advantageous interference processing provided by these teachings is particularly important in heterogeneous networks, especially when considering small-cell range expansion. A "heterogeneous network" will be understood as including two or more types base stations or access points, such as higher-power macro base stations that provide large-area macro cells, and one or more lower-power micro base stations that provide smaller micro cells that overlay or extend the macro cells. In a typical case, the micro cells operate as hotspots offering higher data rate services within a limited area, or fill in coverage gaps in the macro layer.

In any case, by improving the quality of parameter estimation, the disclosed teachings improve the corresponding efficiency of IC at wireless devices, e.g., mobile terminals or network base stations. The result is improved link performance and user experience, and increased network capacity.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of received signal processing in a wireless communication apparatus comprising:
   receiving a wireless communication signal;
   generating initial symbol estimates for data symbols received in a first signal component of the wireless communication signal;
   forming a statistical representation of symbol magnitudes of the initial symbol estimates;
   comparing the statistical representation to a number of reference representations to obtain comparison results with respect to each reference representation, wherein each reference representation represents a characteristic symbol magnitude distribution for data symbols that are jointly parameterized according to a particular combination of defined values for two or more signal parameters from among a defined set of signal parameters that includes any two or more of: a symbol modulation format, a received symbol quality, a symbol scaling factor, a symbol impairment variance estimate, and Multiple-Input-Multiple-Output, MIMO, symbol precoding weights;
   estimating one or more signal parameters for the data symbols, based on evaluating the comparison results; and
   processing the initial symbol estimates as a function of the estimated one or more signal parameters.

2. The method of claim 1, wherein the wireless communication apparatus stores a set of the reference representations, and wherein the method further comprises:
   estimating one or more reference signal parameters using reference symbols received in the wireless communication signal, including estimating at least one of a reference symbol impairment variance and a reference symbol quality; and
   adapting a count or selection of the reference representations taken from the set of reference representations for use as said number of reference representations in the step of comparing, based on the estimated one or more reference signal parameters.

3. The method of claim 1, further comprising limiting a signal quality range considered in said step of comparing, in dependence on an impairment variance confidence interval determined by estimating a reference symbol impairment variance from reference symbols 48 received in the wireless communication signal.

4. The method of claim 3, wherein limiting the signal quality range considered in said step of comparing comprises:
   estimating a reference symbol quality from the reference symbols;
   scaling the reference symbol impairment variance to obtain an estimate of data symbol impairment variance for the data symbols;
   determining the impairment variance confidence interval from the estimate of data symbol impairment variance;
   determining a search space within a set of reference representations in dependence on the impairment variance confidence interval; and
   selecting, in dependence on the search space, a corresponding subset of reference representations from a larger set of reference representations, for use as said number of reference representations used in the step of comparing.

5. The method of claim 1, wherein each initial symbol estimate comprises one or more complex sample values obtained from the wireless communication signal for a corresponding one of the data symbols.

6. The method of claim 1, wherein each initial symbol estimate comprises a combined value generated for a corresponding one of the data symbols, by combining corresponding sample values obtained from the wireless communication signal across at least one of: two or more receiver antennas, and two or more multipath components of the wireless communication signal.

7. The method of claim 1, further comprising calculating a normalization factor for the initial symbol estimates based on an average amplitude of the initial symbol estimates or an average power of the initial symbol estimates, and using the normalization factor to normalize the symbol magnitudes used to form the statistical representation.

8. The method of claim 1, wherein comparing the statistical representation to each reference representation included in the number of reference representations comprises computing a correlation or distance metric indicating an extent to which the statistical representation matches the reference representation.

9. The method of claim 1, wherein estimating the one or more signal parameters of the data symbols comprises jointly estimating a symbol scaling factor and a symbol impairment variance for the data symbols, and wherein processing as a function of the estimated one or more signal parameters comprises computing soft symbol values corresponding to the initial symbol estimates in dependence on the estimated symbol scaling factor and the estimated symbol impairment variance.

10. The method of claim 9, further comprising using the soft symbol values to cancel interference in the wireless communication signal arising from the data symbols.

11. The method of claim 1, wherein estimating the one or more signal parameters for the data symbols comprises:
  determining which one of the reference representations among said number of reference representations is a best-matching reference representation; and
  taking one or more of the corresponding defined values that were used to jointly parameterize the best-matching reference representation as said one or more estimated signal parameters, or deriving said estimated one or more signal parameters from said corresponding defined values.

12. The method of claim 1, wherein the statistical representation and the reference representations comprise any one of: symbol magnitude distribution histograms, central moment representations of the symbol magnitude distributions, and kurtosis values of the symbol magnitude distributions.

13. A wireless communication apparatus configured for operation in a wireless communication network and comprising:
  receiver circuitry configured to receive a wireless communication signal;
  a processing circuit operatively associated with the receiver circuitry and configured to:
    generate initial symbol estimates for data symbols received in a first signal component of the wireless communication signal;
    form a statistical representation of symbol magnitudes of the initial symbol estimates;
    compare the statistical representation to a number of reference representations to obtain comparison results with respect to each reference representation, wherein each reference representation represents a characteristic symbol magnitude distribution for data symbols that are jointly parameterized according to a particular combination of defined values for two or more signal parameters from among a defined set of signal parameters that includes any two or more of: a symbol modulation format, a received symbol quality, a symbol scaling factor, a symbol impairment variance estimate, and Multiple-Input-Multiple-Output, MIMO, symbol precoding weights;
    estimate one or more signal parameters for the data symbols, based on evaluating the comparison results; and
    process the initial symbol estimates as a function of the estimated one or more signal parameters.

14. The wireless communication apparatus of claim 13, wherein the wireless communication apparatus includes a storage element storing a set of reference representations in the wireless communication apparatus, and wherein the processing circuit is configured to:
  estimate one or more reference signal parameters using reference symbols received in the wireless communication signal, including estimating at least one of a reference symbol impairment variance and a reference symbol quality; and
  adapt a count or selection of the reference representations taken from the set of reference representations for use as said number of reference representations in the step of comparing, based on the estimated one or more reference signal parameters.

15. The wireless communication apparatus of claim 13, wherein the processing circuit is configured to limit a signal quality range considered in said step of comparing, in dependence on an impairment variance confidence interval determined by estimating a reference symbol impairment variance from reference symbols received in the wireless communication signal.

16. The wireless communication apparatus of claim 15, wherein the processing circuit is configured to limit the signal quality range considered in the comparing operation, based on being configured to:
  estimate a reference symbol quality from the reference symbols;
  scale the reference symbol impairment variance to obtain an estimate of data symbol impairment variance for the data symbols;
  determine the impairment variance confidence interval from the estimate of data symbol impairment variance;
  determine a search space within a set of reference representations in dependence on the impairment variance confidence interval; and
  select, in dependence on the search space, a corresponding subset of reference representations from a larger set of reference representations, for use as said number of reference representations used in the comparing operation.

17. The wireless communication apparatus of claim 13, wherein the processing circuit is configured to determine each initial symbol estimate as one or more complex sample values obtained from the wireless communication signal for a corresponding one of the data symbols.

18. The wireless communication apparatus of claim 13, wherein the processing circuit is configured to determine each initial symbol estimate as a combined value generated for a corresponding one of the data symbols, based on the processing circuit being configured to combine corresponding samples values obtained from the wireless communication signal across at least one of: two or more receiver antennas, and two or more multipath components of the wireless communication signal.

19. The wireless communication apparatus of claim 13, wherein the processing circuit is configured to calculate a normalization factor for the initial symbol estimates based on an average amplitude of the initial symbol estimates or an average power of the initial symbol estimates, and use the normalization factor to normalize the symbol magnitudes used to form the statistical representation.

20. The wireless communication apparatus of claim 13, wherein the processing circuit is configured to compare the statistical representation to each reference representation included in the number of reference representations used in the comparison operation, based on being configured to compute a correlation or distance metric indicating an extent to which the statistical representation matches the reference representation.

21. The wireless communication apparatus of claim 13, wherein the processing circuit is configured to estimate the one or more signal parameters of the data symbols by jointly estimating a symbol scaling factor and a symbol impairment variance for the data symbols, and wherein processing circuit is configured to process the initial symbol estimates as a function of the estimated one or more signal parameters by computing soft symbol values corresponding to the initial symbol estimates in dependence on the estimated symbol scaling factor and the estimated symbol impairment variance.

22. The wireless communication apparatus of claim 21, wherein the processing circuit is configured to use the soft symbol values to cancel interference in the wireless communication signal arising from the data symbols.

23. The wireless communication apparatus of claim 13, wherein the processing circuit comprises:
a symbol estimation circuit configured to generate the first symbol estimates; and
a parameter estimation circuit configured to estimate the one or more signal parameters of the data symbols.

24. The wireless communication apparatus of claim 13, wherein the processing circuit is configured to estimate the one or more signal parameters for the data symbols by determining which one of the reference representations among said number of reference representations is a best-matching reference representation, and taking one or more of the corresponding defined values that were used to jointly parameterize the best-matching reference representation as said one or more estimated signal parameters, or deriving said estimated one or more signal parameters from said corresponding defined values.

25. The wireless communication apparatus of claim 13, wherein the statistical representation and the reference representations comprise any one of: symbol magnitude distribution histograms, central moment representations of the symbol magnitude distributions, kurtosis values of the symbol magnitude distributions, and wherein the reference representations are jointly parameterized as a function of two or more of the signal parameters to be estimated for the data symbols.

26. A non-transitory computer-readable medium storing a computer program comprising program instructions for execution by a processing circuit of a wireless apparatus that is configured for operation in a wireless communication network, whereby the wireless apparatus is configured to:
generate initial symbol estimates for data symbols received in a first signal component of the wireless communication signal;
form a statistical representation of symbol magnitudes of the initial symbol estimates;
compare the statistical representation to a number of reference representations to obtain comparison results with respect to each reference representation, wherein each reference representation represents a characteristic symbol magnitude distribution for data symbols that are jointly parameterized according to a particular combination of defined values for two or more signal parameters from among a defined set of signal parameters that includes any two or more of: a symbol modulation format, a received symbol quality, a symbol scaling factor, a symbol impairment variance estimate, and Multiple-Input-Multiple-Output, MIMO, symbol precoding weights;
estimate one or more signal parameters for the data symbols, based on evaluating the comparison results; and
process the initial symbol estimates as a function of the estimated one or more signal parameters.

\* \* \* \* \*

UNITED STATES PATENT AND TRADEMARK OFFICE
CERTIFICATE OF CORRECTION

PATENT NO.         : 9,071,472 B1                                         Page 1 of 1
APPLICATION NO.    : 14/323073
DATED              : June 30, 2015
INVENTOR(S)        : Reial et al.

It is certified that error appears in the above-identified patent and that said Letters Patent is hereby corrected as shown below:

In the Specification

In Column 5, Lines 6-7, delete "antennas 34" and insert -- antennas 12 --, therefor.

In Column 15, Line 65, delete "$\tau_{init}^2$." and insert -- $\sigma_{init}^2$. --, therefor.

In the Claims

In Column 18, Line 48, in Claim 3, delete "symbols 48" and insert -- symbols --, therefor.

In Column 19, Line 25, in Claim 9, delete "processing as" and insert -- processing the initial symbol estimates as --, therefor.

Signed and Sealed this
Eighth Day of December, 2015

Michelle K. Lee
*Director of the United States Patent and Trademark Office*